United States Patent
Zhou et al.

(10) Patent No.: US 7,652,962 B2
(45) Date of Patent: Jan. 26, 2010

(54) USING PRML READ CHANNEL ADC FOR BLANK/DEFECT AND RIPPLE DETECTION

(75) Inventors: Ting Zhou, Alameda, CA (US); Estuardo Licona, Santa Clara, CA (US); Ju Hi John Hong, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 811 days.

(21) Appl. No.: 11/305,764

(22) Filed: Dec. 16, 2005

(65) Prior Publication Data

US 2007/0143771 A1 Jun. 21, 2007

(51) Int. Cl.
*G11B 7/00* (2006.01)
(52) U.S. Cl. ............... 369/53.1; 369/53.12; 369/124.12
(58) Field of Classification Search ............... 369/53.22, 369/44.32, 44.29, 53.13, 53.14, 53.15, 53.32, 369/53.33, 44.34, 53.1, 53.121, 124.12, 124.1, 369/44.35
See application file for complete search history.

(56) References Cited

U.S. PATENT DOCUMENTS 6,791,916 B2 * 9/2004 Tateishi et al. ........... 369/44.32
6,982,941 B2 * 1/2006 Yamanoi et al. ......... 369/53.22
7,336,569 B2 * 2/2008 King et al. ............... 369/44.29

FOREIGN PATENT DOCUMENTS

JP 2005-317154 * 11/2005

* cited by examiner

*Primary Examiner*—Nabil Z Hindi
(74) *Attorney, Agent, or Firm*—Christopher P. Maiorana, PC

(57) ABSTRACT

An apparatus including a photo detector circuit, a first circuit, a second circuit and a third circuit. The photo detector circuit may be configured to generate an RF signal in response to a laser spot on a surface of an optical disc. The first circuit may be configured to generate a first digital signal in response to an AC-coupled version of the RF signal. The second circuit may be configured to generate a second digital signal in response to a DC-coupled version of the RF signal. The third circuit may be configured to generate one or more detect signals in response to the first digital signal and the second digital signal. Each of the one or more detect signals may indicate a respective condition of the surface of the optical disc.

21 Claims, 4 Drawing Sheets

USING PRML READ CHANNEL ADC FOR BLANK/DEFECT AND RIPPLE DETECTION

FIELD OF THE INVENTION

The present invention relates to optical drive design generally and, more particularly, to a method and/or apparatus for using PRML read channel ADC for blank/defect and ripple detection.

BACKGROUND OF THE INVENTION

Conventional DVD front end chips implement several detected signals that are used by control and/or servo circuitry. The detected signals include Blank, Defect and Ripple (or Mirror) signals. The Blank signal tells the control circuitry whether the read laser spot is currently on an un-recorded area of a disc. The Defect signal tells the control circuitry whether the laser spot is currently on a defective area of a disc. The Ripple (or Mirror) signal tells the servo circuitry whether the laser spot is currently on a land or mark (groove) region.

In one conventional approach for generating the Blank and Defect signals, analog top (or peak) and bottom holds are used on a DC-coupled RF signal. When a difference between an output of the top hold and an output of the bottom hold is below a preset threshold, a defect/blank condition is detected. By comparing the output of the bottom hold to another preset threshold, a blank condition is detected when the output of the bottom hold is greater than the preset threshold and a defect condition is detected when the output of the bottom hold is lower than the preset threshold. However, the above approach has a disadvantage because the peak and bottom hold time constants are relatively large at low speed and therefore, involve a large capacitor either on chip or external to the chip. Also, the preset threshold has to be set differently according to media type and speed. The non-uniformity of a disc can some times cause unreliable detection.

In another conventional approach for generating the Blank and Defect signals, an AC-coupled RF signal is sliced with a preset non-zero threshold. The sliced output is sent to several programmable one-shot circuits to filter out noise and the outputs of the one-shots are combined. The combinational output of the one-shots can be used to detect a non-blank condition. However, the combinational output of the one-shots cannot be used to detect the defect condition.

In one conventional approach to detect the defect condition, the DC-coupled RF signal is low pass filtered to generate an analog MBS signal and converted into a digital MBS signal. The digital MBS signal is then compared to a fixed threshold. In another conventional approach to detect the defect condition, a higher bandwidth low passed MBS signal and a lower bandwidth low passed MBS signal are generated and a comparison is performed, where the lower bandwidth low pass filter acts like an adaptive threshold. However, defect detection is relatively slow. Because the defect detection is slow, a servo and read channel clock can already have moved too much by the time the defect is detected.

In a conventional approach for generating the ripple signal, a bottom hold is applied to the DC-coupled RF signal and an output of the bottom hold is compared to a preset threshold. However, the bottom hold time constant is relatively large at low speed and, therefore, involves a large capacitor either on chip or external to the chip.

SUMMARY OF THE INVENTION

The present invention concerns an apparatus including a photo detector circuit, a first circuit, a second circuit and a third circuit. The photo detector circuit may be configured to generate an RF signal in response to a laser spot on a surface of an optical disc. The first circuit may be configured to generate a first digital signal in response to an AC-coupled version of the RF signal. The second circuit may be configured to generate a second digital signal in response to a DC-coupled version of the RF signal. The third circuit may be configured to generate one or more detect signals in response to the first digital signal and the second digital signal. Each of the one or more detect signals may indicate a respective condition of the surface of the optical disc.

The objects, features and advantages of the present invention include providing a method and/or apparatus for using a PRML read channel ADC for blank/defect and ripple detection that may (i) use a read channel ADC to detect defect/blank and ripple, (ii) implement digital top and bottom holders, (iii) implement short term holders for detecting an instant envelope, (iv) implement long term holders to track media uniformity, (v) implement thresholds that are proportional to outputs of the long term holders, (vi) use an MBS signal to determine blank or defect conditions, (vii) eliminate costly analog holders, (viii) implement top and bottom holders in much smaller area, (ix) reduce cost and/or (x) track media variation automatically.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
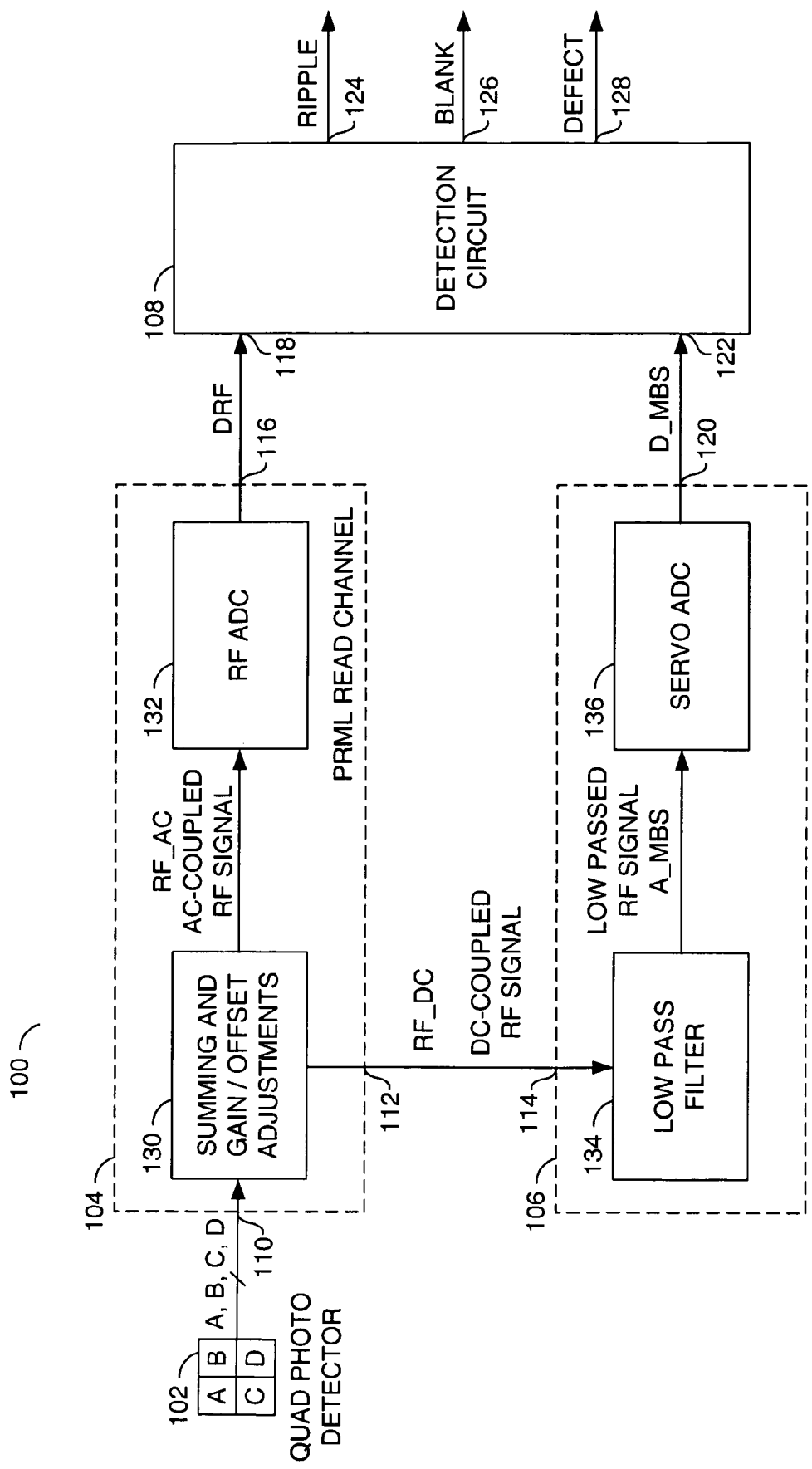
FIG. 1 is a block diagram illustrating an optical disc system in accordance with the present invention.

Referring to FIG. 1, a block diagram is shown illustrating an optical disc system 100 in accordance with a preferred embodiment of the present invention. In one example, the system 100 may comprise an optical disc player or player/recorder. The system 100 may comprise an optical pick-up head (OPU) 102, a circuit (or block) 104, a circuit (or block) 106 and a circuit (or block) 108. The optical pick-up head 102 may be implemented, in one example, with a quad photo detector. The circuit 104 may be implemented as a partial response maximum likelihood (PRML) read channel. The circuit 106 may be implemented as part of a servo circuit. The circuit 108 may be implemented as a detection circuit.

The OPU 102 may have a number of outputs that may present a number of signals (e.g., A, B, C and D) to an input 110 of the circuit 104. The circuit 104 may have (i) an output 112 that may present a signal (e.g., RF_DC) to an input 114 of the circuit 106 and (ii) an output 116 that may present a signal (e.g., DRF) to an input 118 of the circuit 108. The signal RF_DC may comprise a DC-coupled radio frequency (RF) signal. The signal DRF may be implemented, in one example,"

as a digitized RF signal. The circuit 104 may be configured to generate the signals RF_DC and DRF in response to the signals A, B, C and D.

The circuit 106 may have an output 120 that may present a signal (e.g., D_MBS) to an input 122 of the circuit 108. The signal D_MBS may be implemented as a DC-coupled, bandwidth limited, digitized sum of the signals A, B, C and D. The circuit 108 may have a first output 124 that may present a signal (e.g., RIPPLE), a second output 126 that may present a signal (e.g., BLANK) and a third output 128 that may present a signal (e.g., DEFECT). The signal RIPPLE may be configured to indicate whether a laser spot detected by the optical pick-up head 102 is currently on a land or a groove region of an optical disc. The signal BLANK may be configured to indicate whether the read laser spot is currently on an unrecorded area of the disc. The signal DEFECT may be configured to indicate whether the laser spot is currently on a defective area of a disc (e.g., defects may be due to a black dot, a scratch and/or an air bubble on the disc).

The circuit 104 may be configured to generate the signals DRF and RF_DC in response to the signals A, B, C and D. The circuit 106 may be configured to generate the signal D_MBS in response to the signal RF_DC. The circuit 108 may be configured to generate the signals RIPPLE, BLANK and DEFECT in response to the signals DRF and D_MBS. The signal BLANK may be used by the servo circuit and other circuits of the optical disc system 100. The signal DEFECT may be used by the read channel and the servo circuit of the optical disc system 100. In one example, the signal RIPPLE may be used during a seek.

In one example, the circuit 104 may comprise a circuit 130 and a circuit 132. The circuit 130 may be implemented as a summing and gain/offset adjustment circuit. The circuit 132 may be implemented as a radio frequency (RF) analog-to-digital converter (ADC) circuit. In one example, the circuit 132 may comprise a fast pipeline ADC circuit. The circuit 130 may have an input that may receive the signals A, B, C and D from the optical pick-up unit 102, a first output that may present the signal RF_DC and a second output that may present a signal (e.g., RF_AC) to an input of the circuit 132. The signal RF_AC may comprise an AC-coupled RF signal. The circuit 132 may have an output that may present the signal DRF. The circuit 132 may be configured to generate the signal DRF in response to the signal RF_AC. In one example, the signal DRF may comprise digitized samples of the signal RF_AC.

The circuit 106 may comprise a circuit (or block) 134 and a circuit (or block) 136. The circuit 134 may be implemented, in one example, as a low pass filter. The circuit 136 may be implemented, in one example, as a servo analog-to-digital converter (ADC). The circuit 134 may have an input that may receive the signal RF_DC and an output that may present a low passed RF signal (e.g., A_MBS) to an input of the circuit 136. The circuit 136 may have an output that may present the signal D_MBS. In one example, the signal D_MBS may comprise digitized samples of the signal A_MBS. The circuits 130, 132, 134 and 136 may be implemented using conventional techniques.

Figure 2:
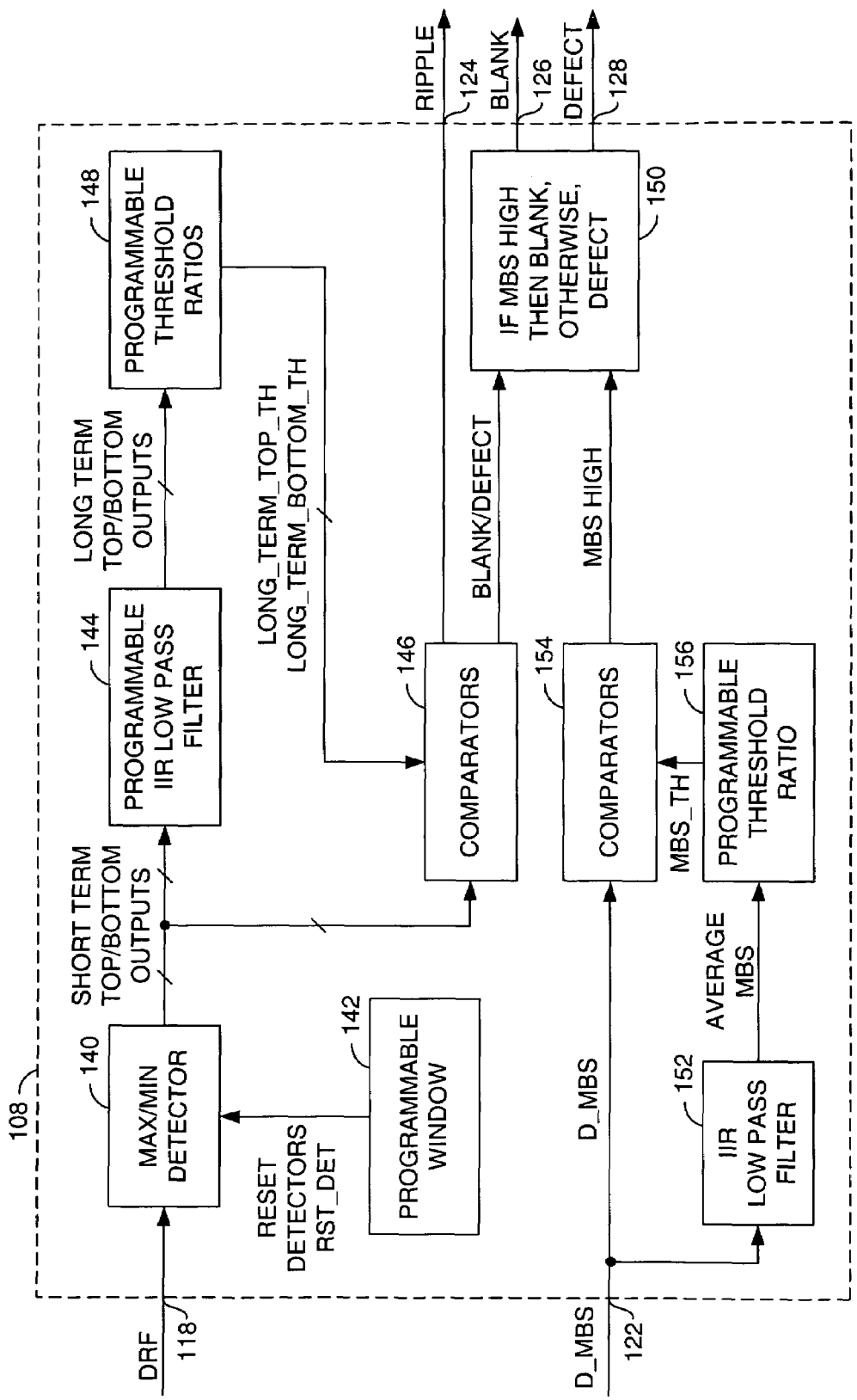
FIG. 2 is a more detailed block diagram of the optical disc system of FIG. 1.

Referring to FIG. 2, a more detailed block diagram is shown illustrating an example of the circuit 108 of FIG. 1 in accordance with a preferred embodiment of the present invention. In one example, the circuit 108 may comprise a circuit (or block) 140, a circuit (or block) 142, a circuit (or block) 144, a circuit (or block) 146, a circuit (or block) 148, a circuit (or block) 150, a circuit (or block) 152, a circuit (or block) 154 and a circuit (or block) 156. The circuit 140 may be implemented, in one example, as a maximum/minimum detector circuit. The circuit 142 may be implemented, in one example, as a programmable window generator. The circuit 144 may be implemented in one example, as a programmable low pass filter. The circuit 146 may be implemented, in one example, as a comparator circuit., The circuit 148 may be implemented, in one example, as a programmable threshold ratio circuit. The circuit 150 may be implemented, in one example, as a logic circuit. The circuit 152 may be implemented, in one example, as a low pass filter circuit. The circuit 154 may be implemented, in one example, as a comparator circuit. The circuit 156 may be implemented, in one example, as a programmable threshold ratio circuit.

In one example, the circuit 144 and the circuit 152 may be implemented using infinite impulse response (IIR) filters. In another example, the circuit 144 and the circuit 152 may be implemented using finite impulse response (FIR) filters. In a preferred embodiment, the circuit 144 and the circuit 152 may be implemented as first order Butterworth filters to optimize circuit size.

The circuit 140 may have a first input that may receive the signal DRF, a second input that may receive a signal (e.g., RST_DET) from an output of the circuit 142 and an output that may present a number of signals (e.g., SHORT_TERM_TOP and SHORT_TERM_BOTTOM) to an input of the circuit 144 and a first input of the circuit 146. The signal RST_DET may be implemented as a reset signal. The signal RST_DET may be configured to reset detectors of the circuit 140. The signals SHORT_TERM_TOP and SHORT_TERM_BOTTOM may be implemented as short term holder signals that may represent the top (highest) and bottom (lowest) values, respectively, of the input signal DRF during a period set by the programmable window generator circuit 142.

The circuit 144 may have an output that may present a number of signals (e.g., LONG_TERM_TOP and LONG_TERM_BOTTOM) to an input of the circuit 148. The signals LONG_TERM_TOP and LONG_TERM_BOTTOM may be implemented as long term holder signals that may represent the long term top (highest) and long term bottom (lowest) values, respectively, of the input signal DRF. The circuit 148 may have an output that may present a number of signals (e.g., LONG_TERM_TOP_TH and LONG_TERM_BOTTOM_TH) to a second input of the circuit. 146. The signals LONG_TERM_TOP_TH and LONG_TERM_BOTTOM_TH may be implemented as threshold signals.

The signals LONG_TERM_TOP_TH and LONG_TERM_BOTTOM_TH may comprise a predetermined portion of values presented by the signals LONG_TERM_TOP and LONG_TERM_BOTTOM. The circuit 148 may be configured to generate the signals LONG_TERM_TOP_TH and LONG_TERM_BOTTOM_TH by, in one example, multiplying the signals LONG_TERM_TOP and LONG_TERM_BOTTOM by respective programmable ratio values. Because the signals LONG_TERM_TOP_TH and LONG_TERM_BOTTOM_TH are generated from the signals LONG_TERM_TOP and LONG_TERM_BOTTOM, the signals LONG_TERM_TOP_TH and LONG_TERM_BOTTOM_TH generally track amplitude and offset properties of the input signal DRF.

The circuit 146 may have a first output that may present the signal RIPPLE and a second output that may present an intermediate signal (e.g., BLANK/DEFECT) to a first input of the circuit 150. The circuit 146 may be configured to compare the signals SHORT_TERM_TOP and SHORT_TERM_BOTTOM with the threshold signals LONG_TERM_TOP_TH and LONG_TERM_BOTTOM_TH. When either (i) the signal SHORT_TERM_TOP has a value that is lower than the signal LONG_TERM- _TOP_TH or (ii) the signal SHORT_TERM_BOTTOM has a value that is greater than the signal LONG_TERM_BOTTOM TH, the signal BLANK/DEFECT may be asserted.

The signal D_MBS may be presented to an input of the circuit 152 and a first input of the circuit 154. The circuit 152 may have an output that may present a signal (e.g., AVERAGE_MBS) to an input of the circuit 156. The circuit 156 may have an output that may present a signal (e.g., MBS_TH) to a second input of the circuit 154. The signal MBS_TH may be implemented as a threshold signal. The circuit 156 may be configured to generate the signal MBS_TH by, in one example, multiplying the signal AVERAGE_MBS by a programmable ratio value.

The circuit 154 may have an output that may present an intermediate signal (e.g., MBS_HIGH) to a second input of the circuit 150. The circuit 150 may have a first output that may present the signal BLANK and a second output that may present the signal DEFECT. The circuit 150 is generally configured to generate the signals BLANK and DEFECT in response to the intermediate signals BLANK/DEFECT and MBS_HIGH. For example, when the BLANK/DEFECT is HIGH (or a logic "1"), the circuit 150 may be configured to assert the signal BLANK when the signal MBS_HIGH is HIGH (or a logic "1") and assert the signal DEFECT when the signal MBS_HIGH is LOW (or a logic "0").

Figure 3:
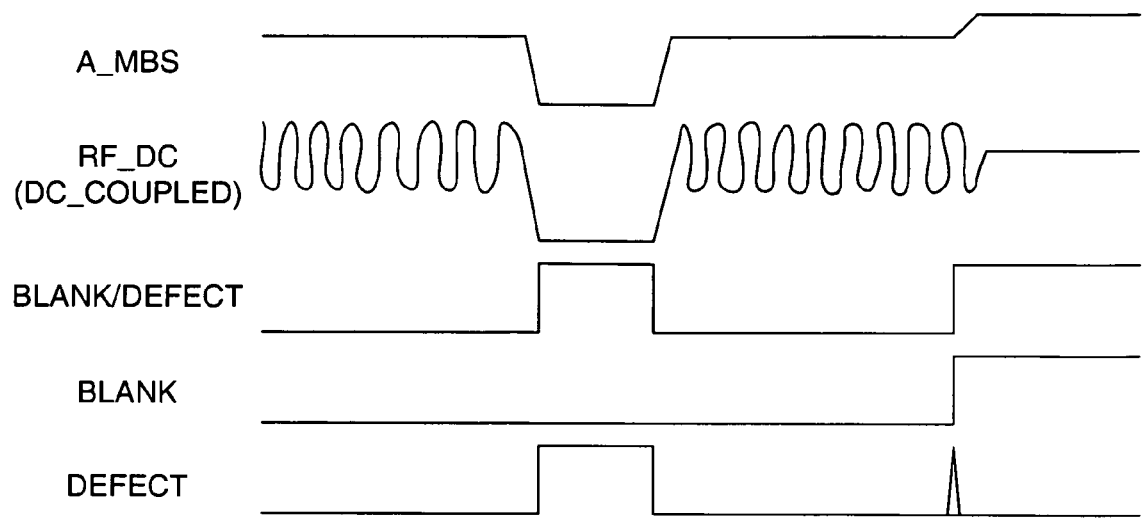
FIG. 3 is a timing diagram illustrating various signals in accordance with a preferred embodiment of the present invention.

Referring to FIG. 3, a timing diagram is shown illustrating various signals of the system 100. When the read channel is AC-coupled, the DC level of the RF signal is generally regenerated from another block. In one example, the low-passed DC-coupled RF signal A_MBS may be used. The level of the signal A_MBS may be calibrated during start up. When the intermediate signal BLANK/DEFECT is asserted, but the signal A_MBS does not go lower than a preset threshold, the signal BLANK is generally asserted. For example, at the transition of a recorded area to a blank area, the signal DEFECT may be asserted first (e.g., depending upon the D_MBS threshold setting for blank detection) and when the signal A_MBS settles (e.g., within 10 us when a corner of the low pass filter 134 is set to 80 KHz) the signal DEFECT may be de-asserted and the signal BLANK asserted instead. However, if the D_MBS threshold is set such that during normal data the output of circuit 154 does not remain LOW (or a logic "0"), the signal BLANK may be asserted first. In general, the blank detection need not be accurate down to a 10 us level. Because the blank detection need not be accurate down to a 10 us level, the detection method of the present invention may be acceptable from a system point of view. In general, the 10 us defect signal will not cause a problem in the servo circuitry.

Figure 4:
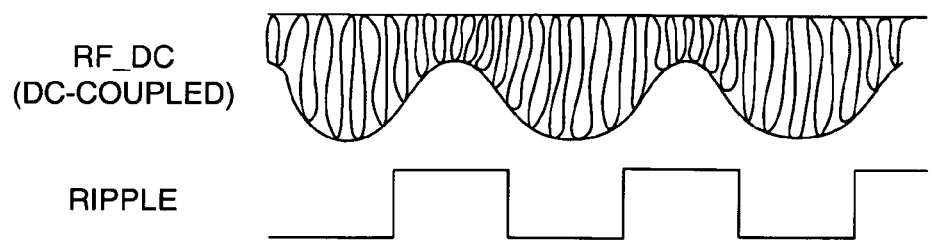
FIG. 4 is a timing diagram illustrating a ripple signal in accordance with a preferred embodiment of the present invention.

Referring to FIG. 4, a timing diagram is shown illustrating an example of a ripple signal implemented in accordance with a preferred embodiment of the present invention. In general, ripple detection may be implemented similarly to the blank/defect detection, but with a different threshold value (still proportional to long term holder outputs) and/or different holder time constants. In general, only the bottom holder is used in detection of ripple since the RF signal is AC-coupled in the read channel. Although an AC-coupled RF signal is used for detection of ripple, a DC-coupled RF signal is shown in FIG. 4 for illustration purposes.

Figure 5:
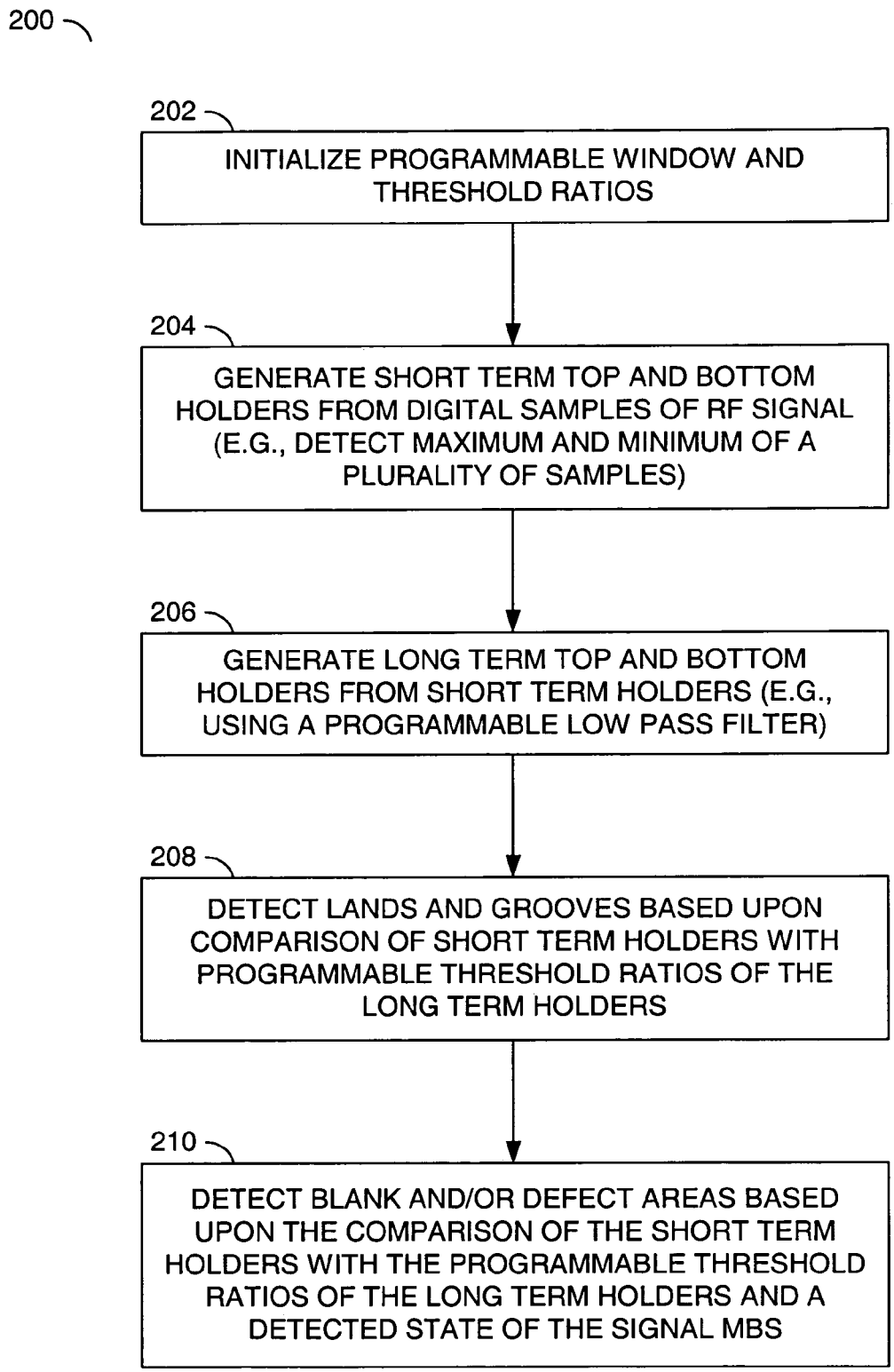
FIG. 5 is a flow diagram illustrating a process for blank/defect and ripple detection in accordance with a preferred embodiment of the present invention.

Referring to FIG. 5, a flow diagram is shown illustrating an example of a process 200 for blank/defect and ripple detection in accordance with a preferred embodiment of the present invention. In one example, the process 200 may comprise a state (or block) 202, a state (or block) 204, a state (or block) 206, a state (or block) 208 and a state (or block) 210. The state 202 may be implemented as an initialization state. The state 204 may be implemented as a short term holder generation state. The state 206 may be implemented as a long term holder state. The state 208 may be implemented as a ripple detection state. The state 210 may be implemented as a blank/defect detection state.

In one example, the process 200 may begin by entering the state 202. In the state 202, the process 200 may initialize (program) a programmable window for sampling the signal DRF and programmable threshold ratios for use in determining whether to assert the signals RIPPLE, BLANK and DEFECT. For example, the programmable window may be used to determine a period over which a minimum and maximum for the signal DRF are determined. When the initialization is complete, the process 200 may move to the state 204. In the state 204, the process 200 may generate short term top and bottom holders (e.g., based on minimum and maximum values determined for the signal DRF). When the short term top and bottom holders are determined, the process 200 may move to the state 206. In the state 206, the process 200 may generate long term top and bottom holders using the short term top and bottom holders (e.g., via a low pass IIR filter with programmable time constants).

When the long term top and bottom holders are determined, the process 200 may move to the state 208. In the state 208, the process 200 may detect whether (i) a read laser spot is on a land or a groove and (ii) whether the laser spot is on an area of a disc that is either blank or defective by comparing the short term top and bottom holders to corresponding thresholds based upon the long term top and bottom holders. The process 200 may move to the state 210 to determine whether (i) the area of the disc is blank or (ii) the area of the disc is defective based on the state of a signal from the servo circuitry. The process 200 may repeatedly move through the states 204-210 during operation of the-optical disc system 100.

The present invention generally implements digital circuitry for detecting the signals BLANK, DEFECT and RIPPLE. In one example, a DVD front end chip may be implemented with a PRML read channel and a fast pipeline/flash ADC available to the designers. Digital versions of the top and the bottom holders may be implemented to replace analog counterparts. Two types of top/bottom holders may be implemented, a short term holder and a long term holder. In general, the term holder refers a device or means (e.g., register, latch, software variable, etc.) that holds the top (e.g., highest) or bottom (e.g., lowest) value of the input signal. The short term holders may be used to detect instantaneous envelope changes. The long term holders may be used to follow variations in the media uniformity.

There are many ways to implement the holders, as will be apparent to those skilled in the relevant art(s). In one example, the short term holder may be implemented by determining maximum or minimum values of the RF signal from the OPU with a programmable number of ADC samples. The long term holders may be implemented, in one example, by passing the short term holders through a programmable low pass IIR filter. In one example, the time constants of the low pass IIR filter may be programmable.

The blank/defect detection thresholds may be set, in one example, as programmable ratios to the long term holders. Setting the blank/defect detection thresholds as a programmable ratio to the long term holders generally accounts for media uniformity. In one example, the detection may be done by either comparing each of the short term holders to a corresponding threshold or comparing a difference between holders (e.g., short term top holder minus short term bottom holder) to a corresponding threshold. In one example, the blank/defect detection function may be performed in the read channel, while the blank or defect judgement may be performed in servo firmware. However, all of the functions may be implemented in hardware.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed)to meet the design criteria of a particular implementation. Additionally, inverters may be added to change a particular polarity of the signals.

The function performed by the flow diagram of FIG. 5 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
    a photo detector circuit configured to generate a radio frequency (RF) signal in response to a laser spot on a surface of an optical disc;
    a first circuit configured to generate a first digital signal in response to an AC-coupled version of said RF signal;
    a second circuit configured to generate a second digital signal in response to a DC-coupled version of said RF signal; and
    a third circuit configured to generate one or more detect signals in response to said first digital signal and said second digital signal, wherein each of said one or more detect signals indicates a respective condition of said surface of said optical disc and said third circuit comprises (i) a detector circuit configured to determine a short term top value and a short term bottom value of said first digital signal during a predetermined period and (ii) a programmable window generator circuit configured to control said predetermined period.

2. The apparatus according to claim 1, wherein said one or more detect signals indicate one or more conditions selected from the group consisting of blank, defect, land, mark and groove.

3. The apparatus according to claim 1, wherein said first circuit comprises a RF analog-to-digital converter (ADC)

4. The apparatus according to claim 3, wherein said RF ADC comprises a fast pipeline/flash ADC.

5. The apparatus according to claim 3, wherein said ADC is part of a partial response maximum likelihood (PRML) read channel.

6. The apparatus according to claim 1, wherein said second circuit comprises:
    a low pass filter configured to receive said DC-coupled version of said RF signal; and
    an analog-to-digital convertor (ADC) coupled to said low pass filter and configured to generate said second digital signal.

7. The apparatus according to claim 6, wherein said ADC is part of a servo circuit.

8. The apparatus according to claim 1, wherein said third circuit further comprises:
    a programmable low pass filter configured to determine a long term top value and a long term bottom value of said first digital signal in response to a plurality of short term top values and a plurality of short term bottom values; and
    a threshold circuit configured to generate a first threshold and a second threshold in response to said long term top value and said long term bottom value of said first digital signal and one or more programmable threshold ratios.

9. The apparatus according to claim 8, wherein said programmable low pass filter comprises a filter selected from the group consisting of an infinite impulse response (IIR) filter and a finite impulse response (FIR) filter.

10. The apparatus according to claim 8, wherein said programmable low pass filter comprises a first order Butterworth filter.

11. The apparatus according to claim 1, wherein said third circuit further comprises:
    a first comparator circuit configured to generate one of said one or more detect signals and a first intermediate signal in response to said short term top value, said short term bottom value, a first threshold and a second threshold;
    a second comparator circuit configured to generate a second intermediate signal in response to said second digital signal and a third threshold; and
    a logic circuit configured to generate at least one other of said one or more detect signals in response to said first and said second intermediate signals, wherein said first threshold, said second threshold and said third threshold are programmable.

12. The apparatus according to claim 11, wherein said third circuit further comprises a low pass filter configured to filter said second digital signal and selected from the group consisting of an infinite impulse response (IIR) filter and a finite impulse response (FIR) filter.

13. A method for using a PRML read channel ADC for blank/defect and ripple detection comprising the steps of:
    generating an RF signal in response to a laser spot on a surface of an optical disc;
    generating a first digital signal in response to an AC-coupled version of said RF signal;
    generating a second digital signal in response to a DC-coupled version of said RF signal;
    generating a short term top holder and a short term bottom holder in response to said first digital signal and a programmable window; and
    generating one or more detect signals in response to said short term top holder and said short term bottom holder, wherein each of said one or more detect signals indicates a respective condition of said surface of said optical disc.

14. The method according to claim 13, wherein the step of generating said first digital signal comprises sampling said AC-coupled version of said RF signal using an analog-to-digital converter (ADC) circuit.

15. The method according to claim 13, wherein the step of generating said second digital signal comprises the steps of:
low pass filtering said DC-coupled version of said RF signal; and
sampling said low pass filtered, DC-coupled version of said RF signal using an analog-to-digital converter (ADC) circuit.

16. The method according to claim 13, wherein the step of generating said one or more detect signals further comprises the steps of:
generating a long term top holder and a long term bottom holder in response to said short term top holder and said short term bottom holder;
generating said one or more detect signals in response to said short term top holder, said short term bottom holder, said long term top holder, said long term bottom holder and one or more programmable threshold ratios.

17. The method according to claim 16, wherein the step of generating said one or more detect signals further comprises generating a first intermediate signal in response to said short term top holder, said short term bottom holder, said long term top holder, said long term bottom holder and said one or more programmable threshold ratios.

18. The method according to claim 17, wherein the step of generating said one or more detect signals further comprises:
generating a blank detect signal and a defect detect signal in response to said first intermediate signal and a second intermediate signal; and
generating said second intermediate signal in response to said second digital signal.

19. An apparatus comprising:
a photo detector circuit configured to generate a radio frequency (RF) signal in response to a laser spot on a surface of an optical disc;
a first circuit configured to generate a first digital signal in response to an AC-coupled version of said RF signal;
a second circuit configured to generate a second digital signal in response to a DC-coupled version of said RF signal; and
a third circuit configured to generate one or more detect signals in response to said first digital signal and said second digital signal, wherein each of said one or more detect signals indicates a respective condition of said surface of said optical disc and said third circuit comprises (i) a programmable low pass filter configured to determine a long term top value and a long term bottom value of said first digital signal in response to a plurality of short term top values and a plurality of short term bottom values determined using a programmable window and (ii) a threshold circuit configured to generate a first threshold and a second threshold in response to said long term top value and said long term bottom value of said first digital signal and one or more programmable threshold ratios.

20. An apparatus comprising:
a photo detector circuit configured to generate a radio frequency (RF) signal in response to a laser spot on a surface of an optical disc;
a first circuit configured to generate a first digital signal in response to an AC-coupled version of said RF signal;
a second circuit configured to generate a second digital signal in response to a DC-coupled version of said RF signal; and
a third circuit configured to generate a plurality of detect signals in response to said first digital signal and said second digital signal, wherein each of said plurality of detect signals indicates a respective condition of said surface of said optical disc, said third circuit comprising (i) a first comparator circuit configured to generate one of said plurality of detect signals and a first intermediate signal in response to a short term top value, a short term bottom value, a first threshold and a second threshold, (ii) a second comparator circuit configured to generate a second intermediate signal in response to said second digital signal and a third threshold and (iii) a logic circuit configured to generate at least one other of said plurality of detect signals in response to said first and said second intermediate signals, wherein said first threshold, said second threshold and said third threshold are programmable.

21. The apparatus according to claim 20, wherein said third circuit further comprises a low pass filter configured to filter said second digital signal and selected from the group consisting of an infinite impulse response (IIR) filter and a finite impulse response (FIR) filter.

* * * * *